United States Patent [19]

Unger et al.

[11] Patent Number: 5,211,902
[45] Date of Patent: May 18, 1993

[54] METHOD OF REDUCING RESIDUAL STRESSES IN THERMOPLASTIC LAMINATES

[75] Inventors: William J. Unger, Rexdale; Jorn S. Hansen, King City; Henry Y. S. Ko, Mississauga, all of Canada

[73] Assignee: The Univ. of Toronto Innovations Foundation, Toronto, Canada

[21] Appl. No.: 739,986

[22] Filed: Aug. 2, 1991

Related U.S. Application Data

[63] Continuation-in-part of Ser. No. 571,498, Aug. 22, 1990, abandoned.

[51] Int. Cl.⁵ .............................................. B29C 71/02
[52] U.S. Cl. .................................... 264/296; 264/346
[58] Field of Search ............... 264/230, 232, 234, 235, 264/237, 294, 296, 319, 320, 322, 324, 340, 345, 346, 348

[56] References Cited

U.S. PATENT DOCUMENTS

3,200,182 8/1965 Hechelhammer et al. .......... 264/235
5,032,339 7/1991 Farraye-Callahan et al. ...... 264/235

Primary Examiner—Leo B. Tentoni
Attorney, Agent, or Firm—Thomas A. O'Rourke

[57] ABSTRACT

A method of reducing residual stresses in a fiber reinforced thermoplastic composite laminate having at least one free edge includes the step of heating a region adjacent the free edge using a platen for a time period sufficient to form a localized melt zone of the thermoplastic in the region. The heating step is however done under a sufficient pressure to prevent delamination of the laminate. After this is done, the region is cooled for a time period and under a pressure sufficient using a platen to solidify the region and to prevent the lamination thereof.

5 Claims, 9 Drawing Sheets

EFFECT OF FREE EDGE RECONSOLIDATION ON FAILURE ENERGY

FIG. 4

EFFECT OF TEMPERATURE ON TRANSVERSE MODULUS

FIG. 5

EFFECT OF COOLING RATE ON NON-DIMENSIONAL CURVATURE

FIG. 6

EFFECT OF LOCALIZED RECONSOLIDATION ON LOW-CYCLE FATIGUE LIFE

$\sigma = 55$ ksi/$R = 0.1$/$f = 10$ Hz
APC-2, $[+35_2/-35_2/0_2/90_2]_S$
DELAMINATION FATIGUE CRACK GROWTH
RECONSOLIDATED FREE EDGE, QUENCH/ANNEAL, $b=2t$

FIG. 7

$\sigma = 55 \text{ ksi} / R = 0.1 / f = 10 \text{ Hz}$
APC-2, $[+35_2/-35_2/0_2/90_2]_S$
DELAMINATION FATIGUE CRACK GROWTH
*BASELINE FREE EDGE*

METHOD OF REDUCING RESIDUAL STRESSES IN THERMOPLASTIC LAMINATES

REFERENCE TO CO-PENDING APPLICATION

The subject matter of application Ser. No. 07/571,498 (now abandoned) entitled 'Method of Reducing Residual Stresses in Thermoplastic Laminates', filed Aug. 22, 1990, of which this application is a continuation-in-part of, is incorporated herein by reference.

BACKGROUND OF THE INVENTION

1. Field of the Invention

The present invention relates to fiber reinforced thermoplastic materials and more particularly to a technique to reduce the stresses therein.

2. Description of Related Art

Thermoplastics reinforced with continuous high strength, high modulus fibers (such as graphite and glass) are known to exhibit enhanced structural properties and manufacturing cost advantages over more conventional fiber-reinforced thermoset composites. In addition, these materials have stiffness-to-weight and strength-to-weight properties which are superior to many metals.

However, as with other composite laminates, thermoplastic composite laminates are prone to matrix cracking and interlaminar failure due in part to what is referred to in the art as the 'Free Edge Effect'. Interlaminar failure is characterized by progressive delamination of the plies of a laminated composite structure leading to a loss of stiffness and strength of the structure. Interlaminar failure is one of the most prevalent and serious failure modes of fiber-reinforced composite structures.

The 'Free Edge Effect' is a term given to the increased and highly localized stresses which occur in the vicinity of a free edge as a result of the edge's 'traction-free' condition. By 'traction free', it is meant that no forces can be transferred beyond the free edge and, therefore, all in-plane stresses within the material must be balanced to zero at the very limits of the free edge, that is, usually within a distance equal to the thickness of the free edge itself.

The manner in which this occurs is very complex but, simply stated, certain internal stress components become highly intensified in order to balance the in-plane stresses at the free edge. It is these intensified stress components which most often cause the interlaminar failure of the laminate.

The 'Free Edge Effect' is believed to arise in part from residual stresses that exist in the laminate. Each of the laminations or plies has a temperature expansion coefficient which is relatively low in the direction of the reinforcing fibers and relatively high in the direction transverse to the reinforcing fibers. When the plies are bonded together, the fibers may be oriented at different angles to provide strength in certain directions, for example at 45, 90, 135 degrees and so on. When the laminate cools from its temperature of manufacture, residual stresses develop both within and between the plies due to the differential thermal shrinkage occurring from one ply to the next.

Since the intensified residual stresses which arise from the 'Free Edge Effect' contribute so strongly to interlaminar failure modes, it is not surprising that a great deal of study has been done to find methods of preventing these failure modes.

There appear to be three conventional solutions to this problem, namely:
1) finding stronger matrix materials to resist the 'Free Edge Effect';
2) using some form of 'three dimensional reinforcement' (such as "stitching") along the free edge, to inhibit the 'Free Edge Effect' from inducing interlaminar failure; and
3) using layers of relatively tougher material between the plies (referred to in the art as 'adhesive interlayers') to provide a tough 'buffer' layer which resists the high residual stresses at the free edge.

While these solutions provide reasonable results, they tend to be expensive and the use of the reinforcement and the interlayers is cumbersome. It is for these reasons that there remains a need for a technique to reduce the 'Free Edge Effect', rather than merely to prevent failure due to it. It is an object therefore of the present invention to provide just such a technique.

SUMMARY OF THE INVENTION

Briefly stated, the invention provides a method of reducing residual stresses in a fiber reinforced thermoplastic composite laminate comprising the steps of:
i) providing a fiber reinforced thermoplastic composite laminate having at least one free edge;
ii) heating a region adjacent the free edge for a time period sufficient to form a localized melt zone of the thermoplastic in the region and under a sufficient pressure to prevent delamination of the composite and thereafter;
iii) cooling the region for a time period and under a pressure sufficient to solidity the region and to prevent delamination thereof.

The present invention is advantageous as it provides a technique to reduce residual stresses in a thermoplastic composite in the region of its free edge. The use of the present process in typical composite lay-ups, that is those where the residual stresses are detrimental, will yield a stronger composite. This is a significant advance in the treatment of fiber reinforced thermoplastics in that:
i) an improvement in the properties of the matrix;
ii) a change in the chemistry of the thermoplastic matrix; or
iii) the provision of inter-layers or stitching are not necessary to achieve this increase in strength.

BRIEF DESCRIPTION OF THE DRAWINGS

A description of a preferred embodiment of the present invention will now be provided with reference to the appended drawings in which.

DESCRIPTION OF THE PREFERRED EMBODIMENTS

Referring now to the figures, there is provided a process to reduce the 'Free Edge Effect' in a fiber reinforced thermoplastic composite panel which may be fabricated, for example, for use on the wing section 10a of an aircraft 10.

As is known, a free edge may appear as a straight line 12 such as at the side edges of the panel 10a or as a curved line 14 such as at the periphery of holes for fasteners formed through the panel 10a as shown at and at the periphery of windows and landing gear access doors (not shown). In the case of the holes and the access doors, the curved lines 14 are within the panel 10a, although they may of course be located on the edge of the panel 10a.

Figure 1:
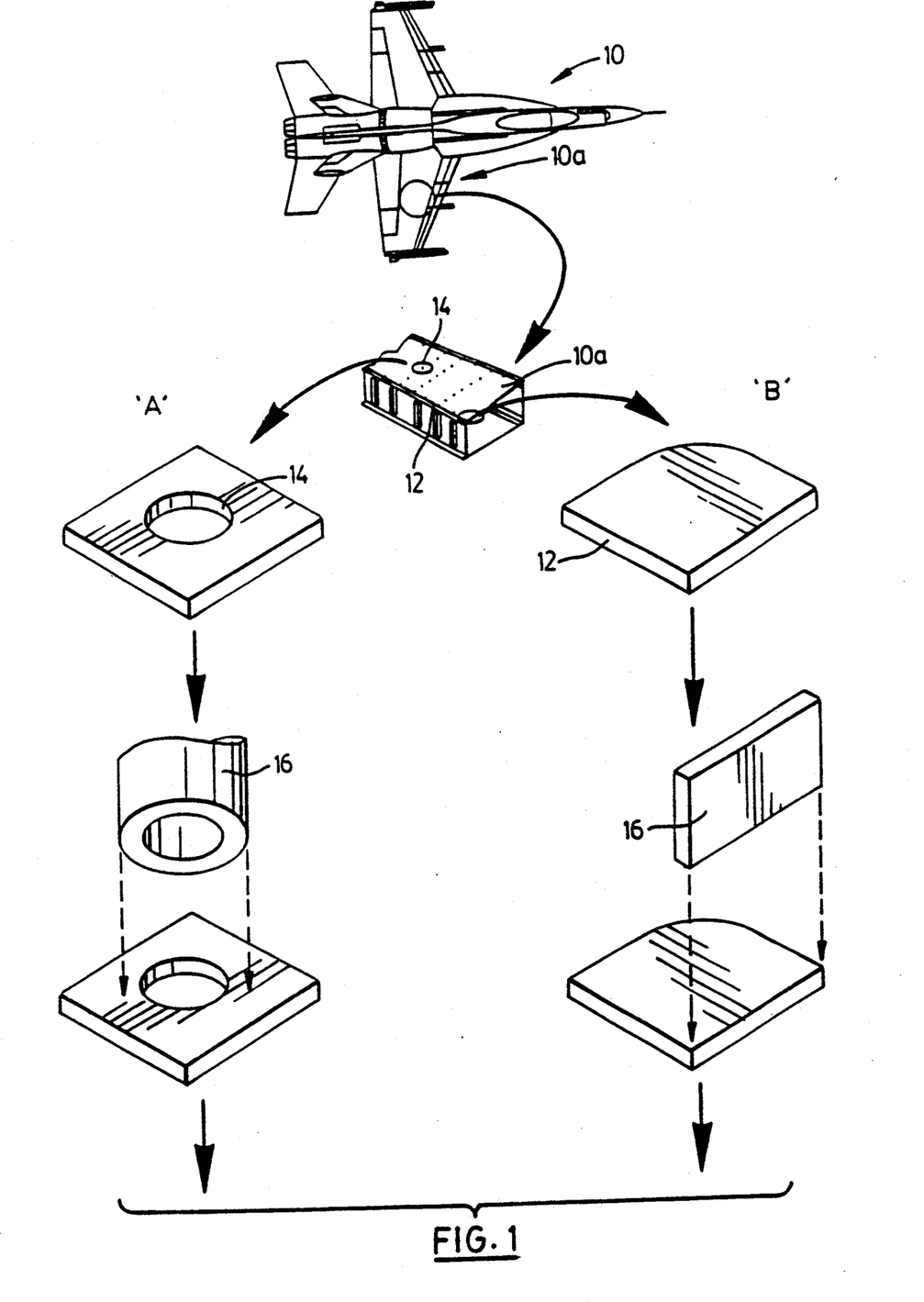
FIG. 1 is a flow diagram illustrating the first segment of a process according to the present invention.
Figure 2:
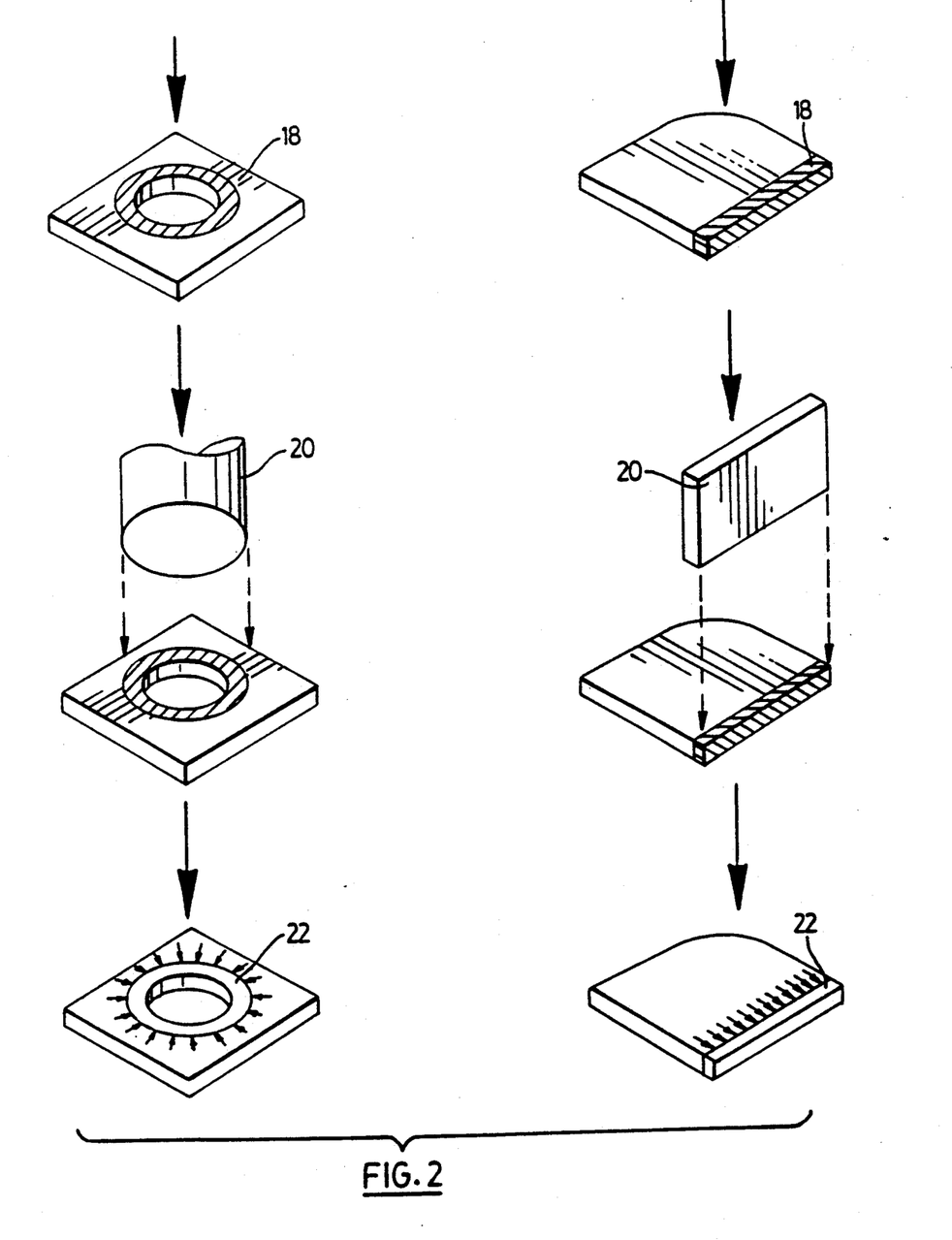
FIG. 2 is a flow diagram illustrating the second segment of the process of FIG. 1.

Accordingly, the present technique has two aspects, one for treatment of curved lines 14 as represented by path 'A' and the other for treatment of straight lines 12 as represented by path 'B'. Each path involves the use of a platen 16 shaped to apply pressure and heat to a region near the free edge. The temperature and pressure of the platen 16 applied to the panel 10a is selected to bring the thermoplastic in the region above its melting point to form a 'Localized Melt Zone' 18 in the region. A cooled platen 20 of similar shape to the heated platen 16 is then applied under pressure to the Localized Melt Zone 20 (or the heated platen itself is cooled by some method) to re-solidify the region thereby forming a Localized Melt Zone 22 of reduced residual stresses.

The pressure applied should not be so high as to cause significant deformation of the molten material. However, the pressure must be sufficient to prevent the composite from delaminating.

The present process significantly improves the static and fatigue strength of a typical composite (hereinafter referred to as the 'Treated' composite) over an identical but 'Untreated' composite. It is believed that two fundamental mechanisms are responsible for this improvement. For the first mechanism, the heating and subsequent cooling of the region surrounding the free edge permits the plies to reposition themselves with respect to one another in response to the residual stresses which develop in the composite upon cooling. As a result, the residual stresses are reduced. This mechanism operates for both amorphous and semi-crystalline thermoplastic composites.

Recent studies have indicated that residual stresses developed in fiber reinforced thermoplastics are particularly intense due to the significantly higher temperatures necessary to process these materials in comparison to their thermoset counterparts. Further more, it has also recently been determined for fiber reinforced semicrystalline thermoplastics that crystallization during cooling from the molten state can significantly increase the residual stresses developed in the material.

With regard to the latter point, it is known that in comparison to amorphous thermoplastics, semi-crystalline thermoplastics exhibit improved chemical resistance and retain a significant portion of their stiffness at elevated temperatures. Thus, rapidity of crystallization and the level of crystallinity ultimately attained are both parameters which the current art teaches should be maximized. Indeed, many semicrystalline thermoplastics include nucleating agents to improve these two characteristics.

Thus, the second mechanism relates to the temperature during the cooling cycle at which residual stresses begin to develop, the so-called stress onset temperature, and is strongly linked to the temperature at which crystallization of the matrix occurs. Since crystallization of the matrix is the underlying cause of this second mechanism, it does not occur in amorphous thermoplastic composites. As will be demonstrate, sufficiently fast cooling rates, which will be referred to as a 'quench', can decrease this onset temperature and thereby decrease the residual stresses of the material.

While reducing residual stresses, the step of suppressing crystallization by itself defeats the advantages that semicrystalline thermoplastics have over amorphous thermoplastics, namely high chemical resistance and retention of elastic properties at high temperature. However, as will be discussed, the crystallinity can be restored (thereby restoring these desirable properties) through a post-quench anneal step.

TESTING

Results from the test to be discussed herein below are believed to verify that the use of the present process reduces residual stresses and thereby enables a typical Treated composite to sustain a higher applied load prior to failure than its Untreated counterpart. In the case of cyclic loading leading to fatigue failure, a Treated composite is able to sustain a greater number of load cycles prior to failure for a given applied load magnitude over its Untreated counterpart.

The composite material used in the tests was APC-2, a graphite reinforced semi-crystalline thermoplastic manufactured by Imperial Chemical Industries (ICI). This material uses AS-4 graphite fiber in a matrix of Polyetheretherketone (PEEK). PEEK is a semi-crystalline thermoplastic with a melting temperature of 343 degrees Celsius.

The specimens tested were manufactured using the standard procedure recommended by ICI (and hereinafter referred to as the ICI Procedure). The ICI Procedure involves heating the assembled lay-up (a lay-up is a particular sequence of ply angles in a laminate) of plies to 380 degrees Celsius under a pressure of 0.5 GPa. When thermal equilibrium between the platen and the thermoplastic is achieved, a consolidation pressure of 1.4 GPa is applied for about five minutes for every 8 plies of thickness of the laminate. Post-consolidation cooling is accomplished at a pressure of 2.0 GPa and at a rate between 10 and 700 degrees Celsius per minute.

Laminates manufactured in this manner were then cut into 2.5 cm wide test specimens using an abrasive cutting wheel.

A variety of lay-ups was manufactured to illustrate the effect of the present process on various failure modes. Two types of free edges were considered in these tests; a straight edge and a curved edge (in the form of a hole).

EFFECT OF MELT ZONE SIZE ON FAILURE STRESS

A test was undertaken to investigate
i) whether the present process was indeed relieving residual stresses or simply healing surface damage (so-called 'micro-cracks') resulting from the cutting operation;

ii) whether a change in the size of the 'Localized Melt Zone' changed the performance of the material.

Straight edge specimens were selected of a lay-up which is known to be prone to delamination under static tension loading. This lay-up is $(+35_2/-35_2/0_2/90_2)_5$.

A baseline group of Untreated specimens was manufactured according to the ICI Procedure. A comparison group of Treated specimens was manufactured according to the ICI Procedure and, additionally, was divided into four sub-groups, each with a different 'Localized Melt Zone Size' as defined by a ratio of b/t where:

b = width of the Localized Melt Zone;
t = thickness of specimen

Each sub-group was processed with the heated platen of a size corresponding to their unique 'Localized Melt Zone Size':

i) at a temperature of about 380 to 390 degrees Celsius;
ii) at a pressure of at least 0.14 GPa; and
iii) for a duration sufficiently long to ensure melting through the entire thickness, namely about 90 to 120 seconds.

The Treated specimens were then cooled:

i) to a temperature of about 18 degrees Celsius;
ii) at a pressure of at least 0.14 GPa;
iii) at a rate of 50 degrees Celsius/minute (cooling rates of this magnitude will be referred to below as 'slow-cool' rates).

Figure 3:
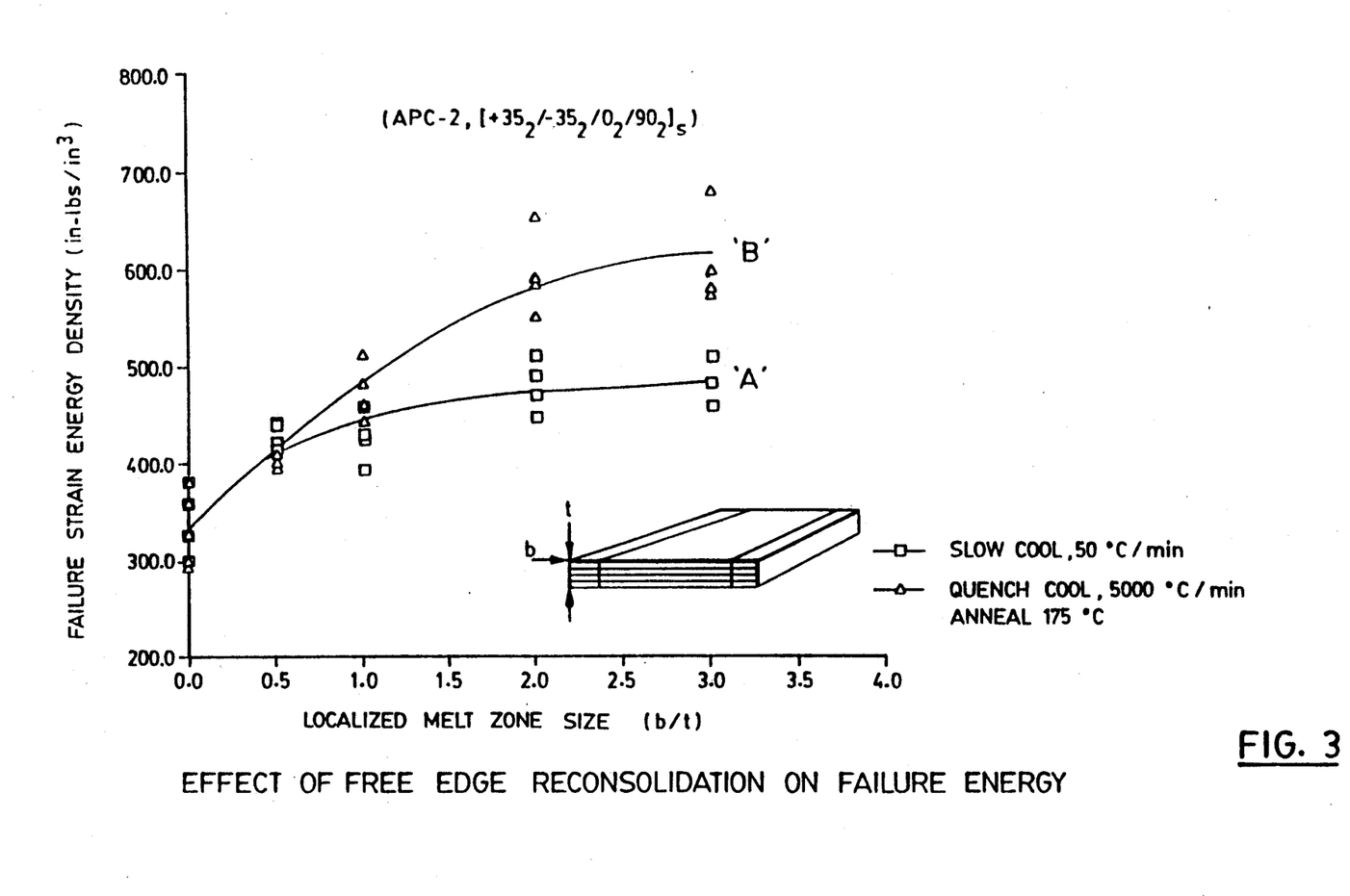
FIG. 3 is a graph of Failure Strain Energy Density versus Localized Melt Zone Size.

Referring to FIG. 3, line A is a best fit of the data for each of the four Treated sub-groups. The data for the Untreated specimens are plotted at b/t=0, corresponding to a Localized Melt Zone Size of zero. The increased strength of the Treated sub groups is apparent. For example, a Localized Melt Zone Size of b/t=2.0 results in a 14 percent improvement over the Untreated sub group.

From FIG. 3, it is apparent that strength increases gradually with Localized Melt Zone Size and appears to reach a plateau between b/t=2.0 and b/t=3.0. This is counter to what would be expected to occur if the simple elimination of surface damage arising from the cutting operation was responsible for the noted strength improvement. Given the crack detection capabilities of optical microscopy and ultrasonic C-scan, cracks of dimension t=0.5 (half the specimen thickness) and larger are easily detectable. However, no cracking of this magnitude was detected. Thus it can be assumed that any cracks, if present at all, must be far less than t=0.5 in size. It logically follows, therefore, that if surface damage healing were the mechanism responsible for the noted strength increase, then the full improvement effect should occur for even the smallest melt zone size of b/t=0.5. This is clearly not the case.

To demonstrate the effect on the failure strength of the suppression of crystallinity in a semi-crystalline thermoplastic composite, the same test was performed on another group of Treated specimens manufactured according to the ICI Procedure. As before, this group was also divided into four sub-groups and each sub-group was processed with the heated platen of a size corresponding to their unique 'Localized Melt Zone Size':

i) at a temperature of about 380 to 390 degrees Celsius;
ii) at a pressure of at least 0.14 GPa; and
iii) for a duration sufficiently long to ensure melting through the entire thickness, namely 90 to 120 seconds.

However, in this case, the Treated specimens were quenched:

i) to a temperature of about 18 degrees Celsius;
ii) at a pressure of at least 0.14 GPa;
iii) at a normal rate of 5000 degrees Celsius/minute.

These specimens will be referred to as the 'Treated-Quenched' specimens.

By the term 'Quench' it is meant a cooling rate from the molten state sufficiently fast to suppress the onset of crystallization and to render the material substantially amorphous at room temperature. For APC-2, the rate required to accomplish this is about 5000 degrees Celsius/minute, although quoted values in the literature vary from 1000 to 10,000 degrees Celsius/minute. Curve B in FIG. 3 shows the failure strain energy density versus Localized Melt Zone Size for this quench process, where crystallinity has been recovered using a post process anneal cycle of 175 degrees Celsius maintained for five minutes. The further improvement in failure energy (using Quench rates) over 'slow cool' rates is evident.

These tests seem to indicate that the 'Free Edge Effect' is intensified by internal stresses that arise as a result of the significantly higher temperatures to process thermoplastics (in comparison to the relatively low temperatures needed to process thermoset plastics) and the promotion of crystallization growth in thermoplastics during cooling. The fundamental reason for this added improvement due to the quench process may be explained by reference to FIG. 4.

Figure 4:
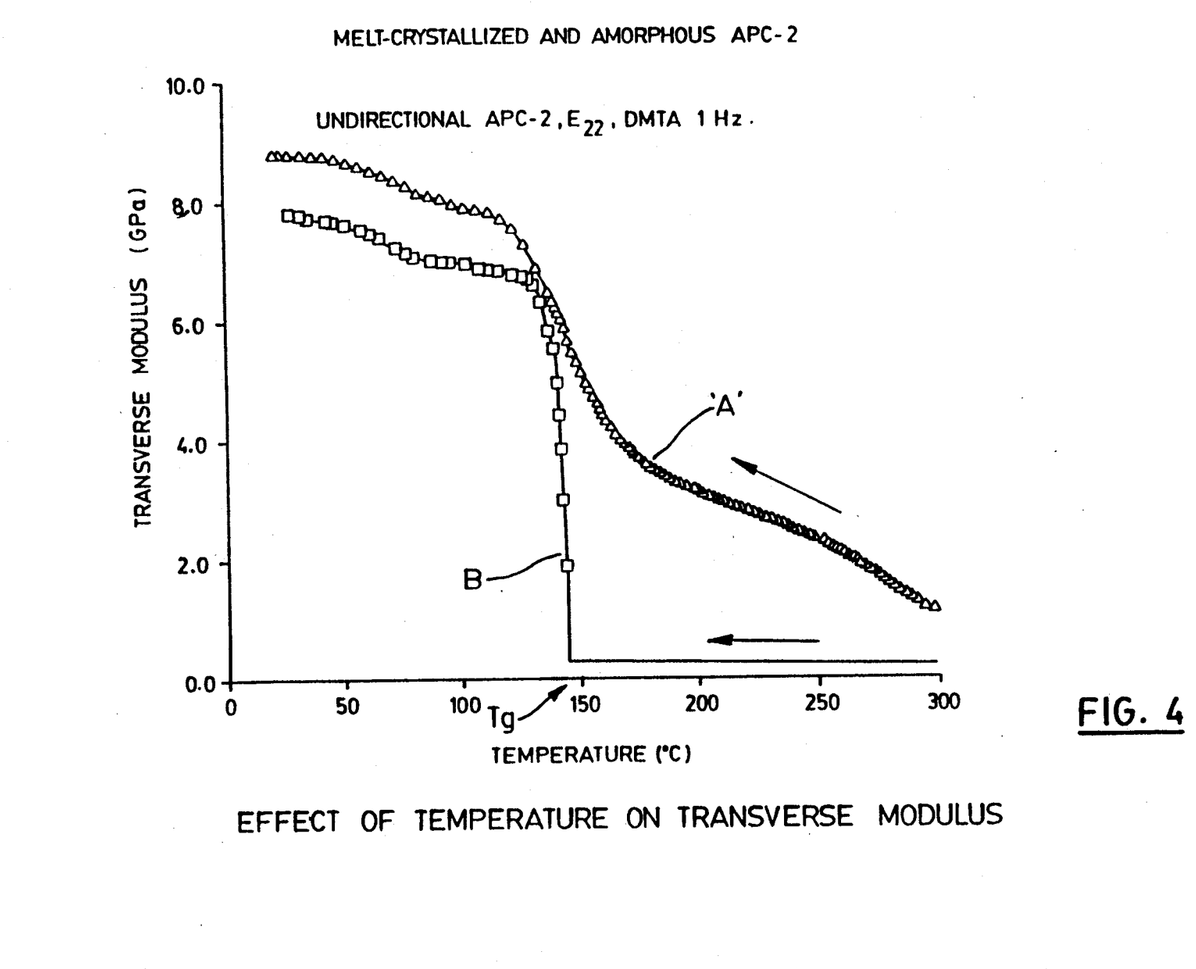
FIG. 4 is a graph of Matrix Transverse Stiffness versus Temperature.

FIG. 4 shows the transverse modulus of APC-2 (ie the modulus measured perpendicular to the fiber direction) as a function of temperature. As the thermoplastic slowly cools from the molten state it suddenly crystallizes at a 'crystallization' temperature Tc which, for APC-2 at cooling rates of about 50 degrees Celsius/minute, is around 300 degrees Celsius. Prior to this crystallization event, the matrix is in an amorphous state and is characterised by little to no transverse stiffness. Once crystallization has occurred, the matrix rigidifies and the transverse modulus then increases with decreasing temperature as shown by curve 'A'.

The temperature at which crystallization occurs depends strongly on the cooling rate. Increasing the cooling rate causes the crystallization temperature to decrease. With sufficiently high cooling rates (so-called quench rates) this 'super-cooling' effect can suppress crystallization substantially rendering the material amorphous. In this amorphous state, the material possesses little or no stiffness during cooling from the molten state until the glass transition temperature (Tg) is reached. For APC-2, Tg is about 143 degrees Celsius. The development of transverse modulus with temperature for the quenched material follows curve B in FIG. 4.

Since the quenched material possesses virtually no stiffness until it reaches Tg, the temperature range over which residual stresses develop, known as delta T, is considerably less than that for the slowly cooled material. Specifically, delta T to room temperature is $(143-18)=125$ degrees Celsius for the quenched material while that for the slowly cooled material is $(300-18)=282$ degrees Celsius.

Figure 5:
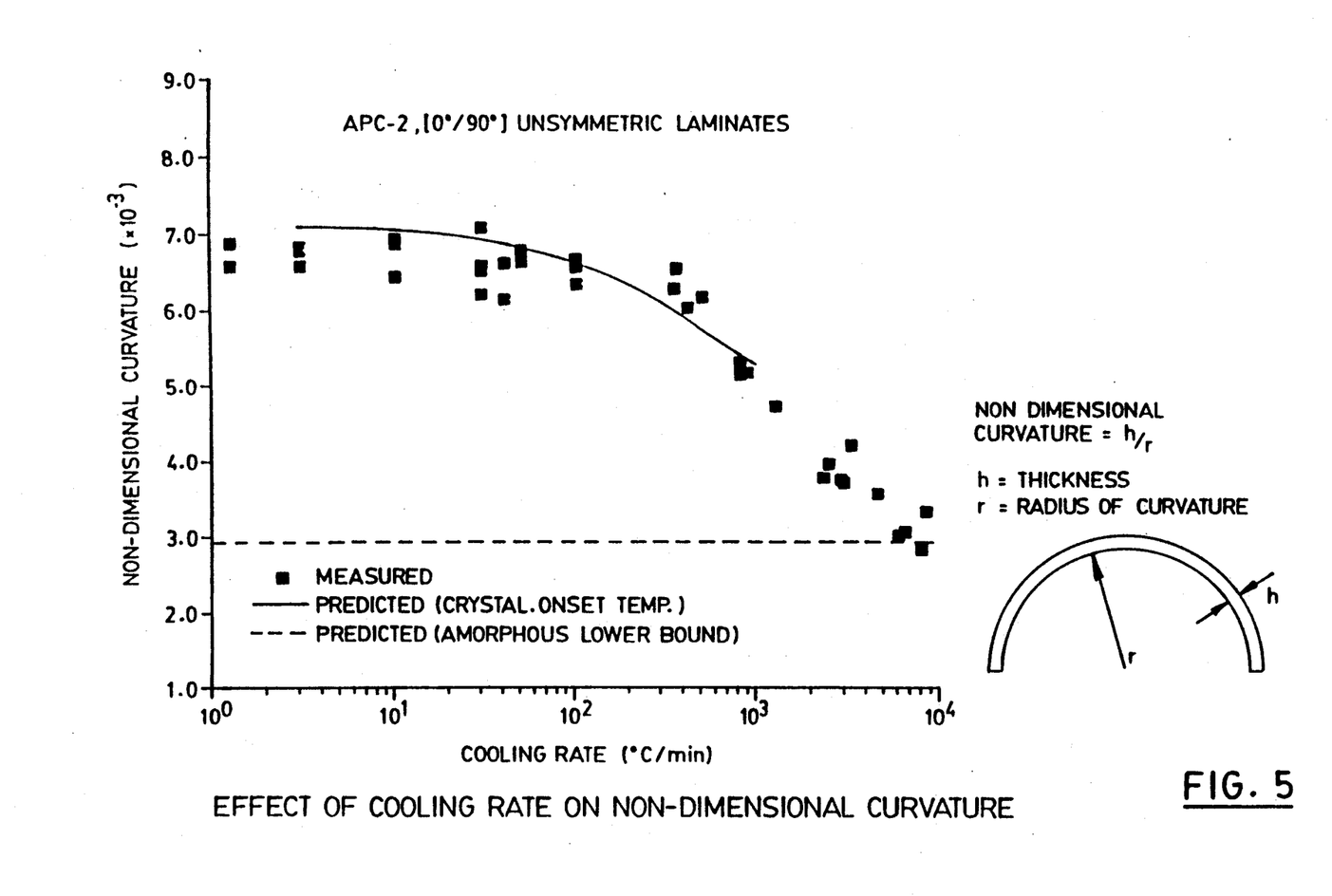
FIG. 5 is a graph illustrating the effect of Cooling Rate on Non-Dimensional Curvature.

This effect of delta T on residual stress is illustrated in FIG. 5, which shows the non-dimensional curvature (of laminates with a [0/90] unsymmetric geometry) as a function of cooling rate. Due to their unsymmetric geometry, such laminates curl in response to the residual stresses which develop upon cooling from the molten state. This curvature is easily measured and thereby functions as an indicator of the residual stresses developed in the material. It can be seen from this plot that the curvature for the specimens cooled at rates less than 600 degrees Celsius/minute are over twice those measured for cooling rates of 5000 degrees C/minute and greater. This illustrates the significant reduction in residual stresses arising from quenching as opposed to slow cooling the material.

Once quenched into the amorphous state, the crystallinity necessary to produce chemical resistance and high temperature performance can be recovered through an annealing cycle. Such a cycle involves heating the material to a temperature above Tg but below its melting temperature, typically 175 to 225 degrees Celsius and maintaining it there for a time period of about five minutes. This annealing process thereby allows crystallization of the material to occur while minimizing residual stresses that would otherwise normally develop with the slow cooling rates from the molten state.

Thus, the present process provides two ways of improving the performance of thermoplastic laminates, namely:
i) by reducing residual stresses at the free edge of amorphous or semi-crystalline thermoplastic composites by forming a Localized Melt Zone at the free edge allowing the plies to reposition themselves with respect to each other in response to the residual stresses which develop in the composite upon cooling;
ii) by quenching a semi-crystalline thermoplastic material into the amorphous state in order to suppress the onset of elastic properties of the material and thereby reduce the effective delta T over which residual stresses develop. Crystallinity may then be recovered during a post-process anneal cycle with little resulting increase in residual stresses.

Equipped with a technique to reduce residual stresses in thermoplastic composites, those skilled in the art will recognize that most conventional lay-ups suffer as a result of residual stresses in the composite. Thus, for those conventional lay-ups, it is believed that the present process will reduce those detrimental stresses and thereby increase the strength of the composite.

CURVED EDGE 'FATIGUE' TEST

The reduction in residual stresses by the present process can lead to an increase in the fatigue life of a Treated composite material over its Untreated counterpart.

Figure 6:
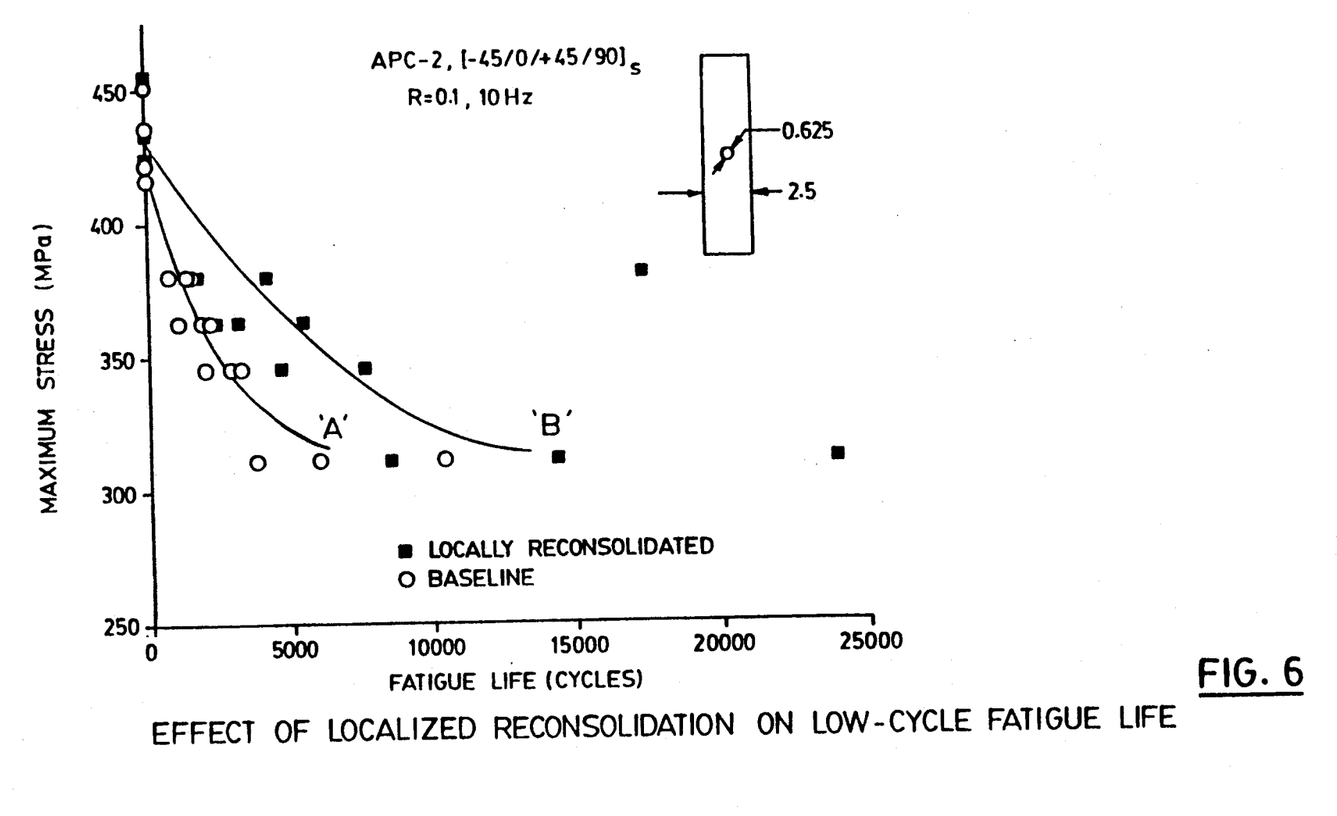
FIG. 6 is a graph illustrating the effect of localized reconsolidation on low cycle fatigue life in selected specimens.

8-ply laminates of the 'quasi-isotropic' lay-up $(-45/0/+45/90)_S$ were manufactured using the ICI Procedure. 2.5 cm×20 cm specimens were then cut from the laminates and 0.625 cm holes were drilled at the center of each specimen. A baseline group of specimens was left Untreated, while the present process was used on a second Treated-Quenched group with the heated platen applied:
i) at a temperature of about 380 to 390 degrees Celsius;
ii) at a pressure of at least 0.14 GPa; and
iii) for a duration sufficient to melt through the entire thickness;

The specimens were then cooled with a platen at room temperature:
i) to a temperature of about 18 degrees Celsius;
ii) at a pressure of at least 0.70 Gpa;
iii) at a cooling rate of greater than 5000 degrees Celsius/minute FIG. 6 illustrates the result of the test. Curve A is the best fit line for the Untreated specimens while curve B is the best fit line for the Treated specimen. The Treated specimens presents a marked increase in fatigue performance over the Untreated specimens.

STRAIGHT EDGE 'FATIGUE' TEST 16-ply laminates of the 'quasi-isotropic' lay-up $(+35_2/-35_2/0_2/90_2)_S$ were manufactured using the ICI Procedure. 2.5 cm×30 cm specimens were then cut from the laminates. A baseline group of specimens were left Untreated, while a second Treated-Quenched group was Treated and Quenched with the present process. The heated platen was applied to form a Localized Melt Zone of size b/t=2 at:
i) a temperature of about 380 to 390 degrees Celsius;
ii) a pressure of at least 0.14 GPa; and
iii) for a duration sufficient to melt through the entire thickness.

The specimens were then quenched:
i) to a temperature of about 18 degrees Celsius;
ii) at a pressure of at least 0.14 GPa;
iii) at a cooling rate of greater than 5000 degrees Celsius/minute Each specimen was tension fatigue tested under sinusoidal loading at R=0.1 with a peak stress of 0.380 GPa at a frequency of 10 hz. The fatigue delamination area was monitored over 100,000 fatigue cycles.

Figure 7:
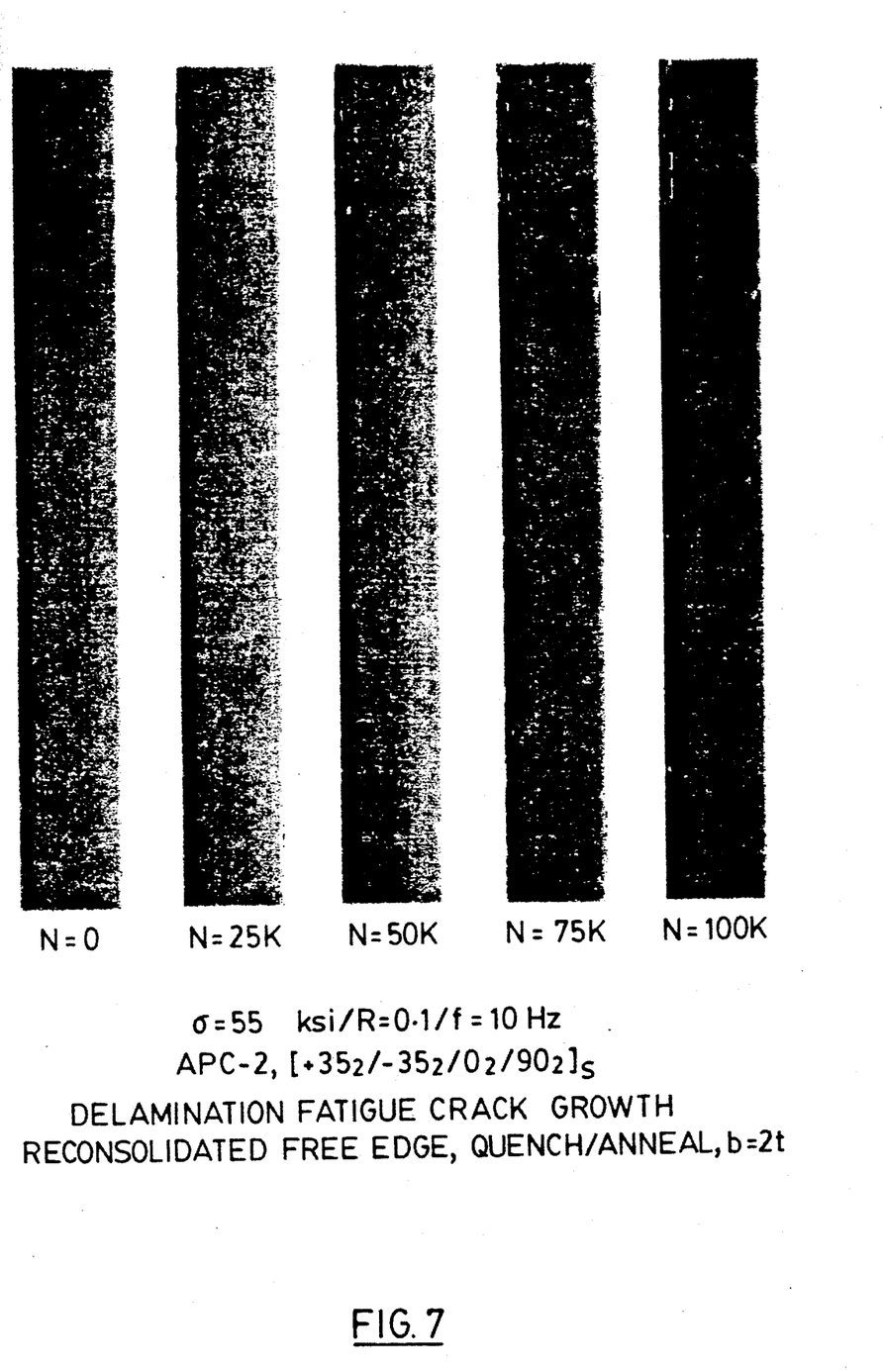
FIG. 7 is an illustration of Delamination Fatigue Crack Growth in selected specimens.
Figure 8:
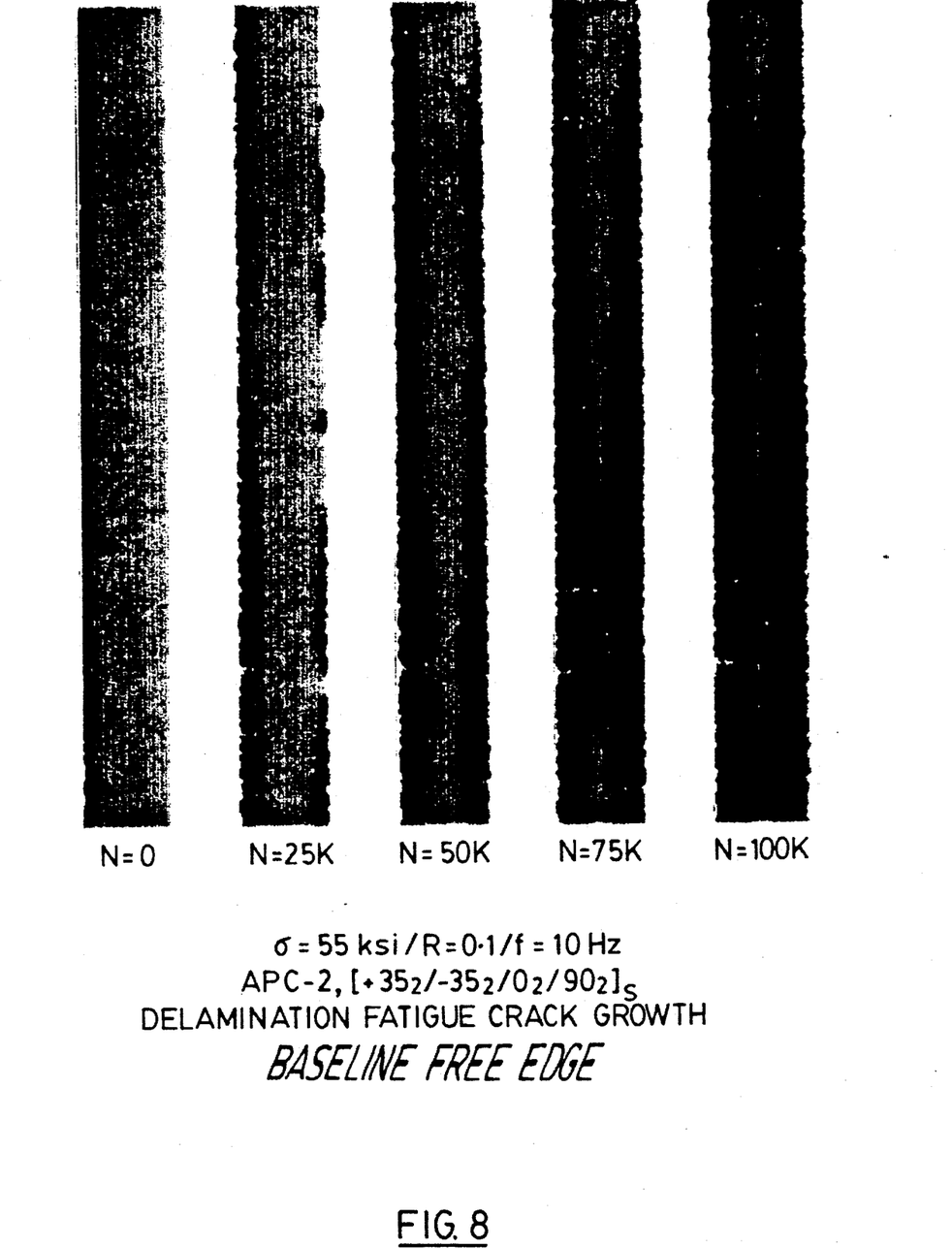
FIG. 8 is another illustration of Delamination Fatigue Crack Growth in selected specimens.

FIG. 7 shows five ultrasonic C-scan views of Treated-Quenched specimens. Each view illustrates the delamination zones in light grey at a different stage in the fatigue cycle where N=number of cycles (×1000). FIG. 8 shows five similar views but for the Untreated specimens.

After 100,000 cycles, over 95 percent of the center plane of the Untreated specimens was delaminated, whereas less than 3 percent of the center plane formed delamination cracks in the Treated-Quenched specimens.

It is apparent from the above results that the present process when applied to thermoplastic composites improves the fatigue life of the laminate. This is consistent with previously listed results and in support of the premise that residual stress reduction is the reason for this fatigue life improvement.

STRAIGHT EDGE STATIC TESTS: SUMMARY

Figure 9:
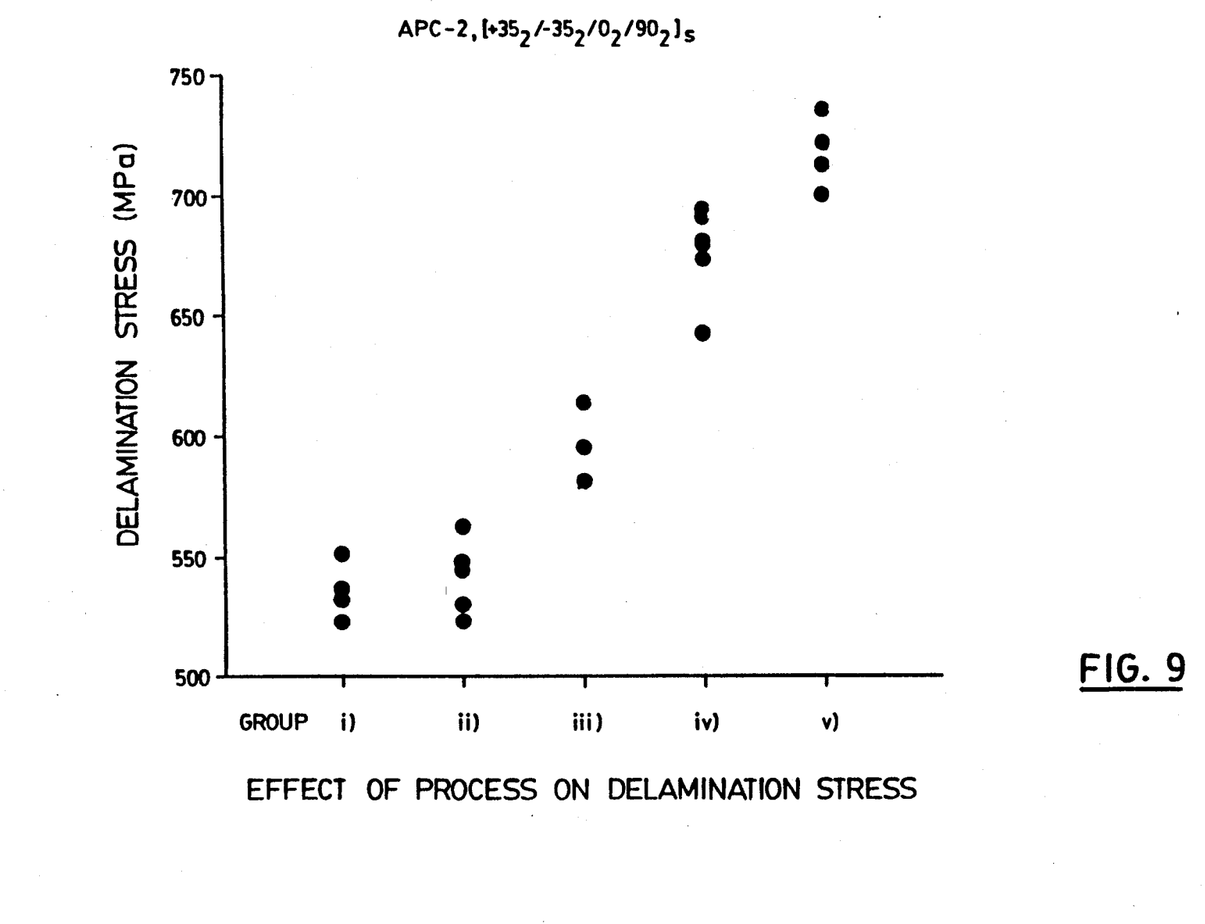
FIG. 9 is graph illustrating Delamination Stress levels for several groups of specimens.

FIG. 9 illustrates the combined results of several tests showing the effect of the present process on the 'Delamination Stress', that is, the applied tensile stress under static loading at the point of delamination failure.

Columns i) to v) illustrate the results for the following groups:
i) Untreated specimens-cut but not sanded or polished;
ii) Untreated specimens-cut, sanded and polished;
iii) Individually Molded specimens;
iv) Untreated specimens-cut from a Quenched laminate; and
v) Treated-Quenched specimens.

Except for the specific differences to be described, all specimens had an identical lay-up. The relevance here is not the type of lay-up used but rather the effect of each applied process on the failure stress. It is expected that the results exhibited in FIG. 8 would apply to any conventional lay-up.

Group i) was cut from a lay-up manufactured according to the ICI Procedure. Specimens were cut from the laminate using an abrasive cutting wheel. The edges of the specimens were not polished so as to leave any surface damage that may have been formed in the cutting step.

Group ii) was formed identically to group i) with the exception that the edges were sanded and polished to remove any cut-related damage.

Group iii) was manufactured by molding each specimen individually (rather than being cut from a formed laminate as with Groups i) and ii)) using the ICI procedure including a slow cool rate of about 50 degrees Celsius/minute. The specimens in this group were therefore equivalent to Treated specimens with a Localized Melt Zone Size of $b/t = w/2$ where w is the specimen width.

Group iv) was manufactured using the ICI Procedure except that the laminate was quenched into the amorphous state at a rate of 5000 degrees Celsius/minute. Crystallinity was then recovered in a post-process anneal cycle at 175 degrees Celsius for a duration of 15 minutes. Specimens were cut from the laminate using an abrasive cutting wheel. The edges of the specimens were not polished so as to leave any surface damage that may have been formed in the cutting step.

Group v) was manufactured in a fashion identical to group i) and was then subsequently Treated and Quenched by the present process, for a melt zone size of $b/t = 2.0$. Crystallinity was recovered for group v) using a post-process anneal cycle at 175 degrees Celsius for a duration of 5 minutes.

Comparison of groups i) and ii) shows that removing any surface damage arising from the cutting operation has little effect on the specimen performance.

Group iii), on the other hand, which is identical in its thermal processing, shows a significant increase in failure stress. This increase is attributable to the increased mobility of the free edge which allows the plies to adjust their positions during cooling from the molten state in response to the residual stresses which develop.

Group iv) shows an even larger increase in failure stress than group iii). This effect stems primarily from the reduction in residual stresses associated with the quench/anneal process by which it was manufactured. Since the free edges of these specimens were formed by cutting rather than by molding the results of group iv) do not reflect the benefits of treating the free edge.

Group v) shows the highest increase in failure stress illustrating the benefits of both aspects of the present process, namely free edge treatment and quenching/annealing.

The present process is believed to reduce the residual stresses at the free edges of a fiber reinforced thermoplastic laminate by forming a Localized Melt Zone in the region of the free edge and subsequently cooling the zone. It is further believed that the heating and subsequent cooling permits the plies to reposition themselves with respect to one another in response to the residual stresses which develop in the composite upon cooling. The subsequent cooling step is further believed to fix the plies in the new positions so that the residual stresses are reduced.

Furthermore, the Quench step of the present invention reduces the range of temperature (Delta T) through which internal stresses can develop.

While the above results demonstrate that Quenching and annealing semi-crystalline thermoplastic composite laminates will significantly improve the mechanical performance of the laminate without the need for treating the free edge. It will be understood that the treatment of the free edge with the quench anneal process will improve the performance further still. Furthermore, given the practical limitations of current equipment, it may be difficult to apply a quench anneal process to an entire laminated structure while ensuring the uniformity of the processes over the entire laminated structure.

It will be understood that the temperatures noted above correspond to the characteristics of the particular material in the tested samples. Changes in the temperatures, pressures and the heating and cooling time periods may be required for other thermoplastic composite materials.

We claim:

1. A method of reducing residual stresses in fiber reinforced thermoplastic composite laminate comprising the steps of:
   i) providing a fiber reinforced thermoplastic composite laminate having at least one free edge;
   ii) heating a region adjacent said free edge for a time period sufficient to form a localized melt zone of the thermoplastic in the region and under a sufficient pressure to prevent delamination of the laminate and thereafter;
   iii) cooling the region for a time period and under a pressure sufficient to solidify the region and to prevent delamination thereof.

2. A method as defined in claim 1 wherein said heating step further includes the step of providing a platen having an abutment surface shaped to engage said region.

3. A method as defined in claim 2 wherein said region is heated to a temperature ranging from between 380 to 400 degrees Celsius and at a pressure of at least 0.14 GPa for a duration sufficient to melt the entire thickness of said laminate.

4. A method as defined in claim 3 wherein said region is cooled to a temperature of approximately 18 degrees Celsius at a pressure of at least 0.14 GPa and at a rate of between 10 and 700 degrees Celsius per minute.

5. A method as defined in claim 1 wherein said region is quenched to a temperature of approximately 18 degrees Celsius at a pressure of at least 0.14 GPa and at a rate of about 5000 degrees Celsius per minute.

* * * * *